United States Patent [19]

Legras et al.

[11] 4,163,823
[45] Aug. 7, 1979

[54] MAGNETIC RECORDING ELEMENTS AND PROCESS OF PREPARATION

[75] Inventors: Jean-Pierre Legras, Clichy-sous-Bois; Claude M. Maréchal, Paris, both of France

[73] Assignee: Eastman Kodak Company, Rochester, N.Y.

[21] Appl. No.: 775,118

[22] Filed: Mar. 7, 1977

[30] Foreign Application Priority Data

Mar. 12, 1976 [FR] France .................................. 76 07073

[51] Int. Cl.$^2$ ............................................ H01F 10/02
[52] U.S. Cl. ...................... 428/304; 427/48; 427/128; 427/130; 427/132; 428/329; 428/336; 428/900
[58] Field of Search ........................ 427/127–132, 427/48; 428/900, 306, 304, 329, 336, 337, 339, 538, 539

[56] References Cited

U.S. PATENT DOCUMENTS

| | | | |
|---|---|---|---|
| 3,398,011 | 8/1968 | Neirotti et al. | 117/65.2 |
| 3,761,311 | 9/1973 | Perrington et al. | 117/239 |
| 3,775,178 | 11/1973 | Perrington et al. | 117/239 |

*Primary Examiner*—Bernard D. Pianalto
*Attorney, Agent, or Firm*—B. D. Weise

[57] ABSTRACT

Magnetic recording elements which combine low modulation noise with excellent high frequency output and their process of preparation are disclosed. Such elements comprise a support having a surface with a peak-to-peak roughness up to about 0.5 micron, which surface is coated with a magnetic recording medium having a thickness in the range of 4 to about 20 microns.

The magnetic recording medium comprises about 8 to 30 percent, by volume, of discrete, non-solid, nonmagnetizable voids that are substantially homogeneously dispersed therein. The magnetic recording medium also contains aligned and oriented acicular magnetizable particles dispersed in a magnetic recording layer which forms an outer surface of the magnetic recording element and has a surface smoothness, determined as percent contact area, of at least 86 percent, the ratio of the thickness of the magnetic recording medium to the peak-to-peak roughness of the support in the elements disclosed is at least 10.

The process disclosed for preparing the above magnetic recording elements comprises the steps of:
(a) forming a dispersion of acicular magnetizable particles in a solution of binder in solvent,
(b) coating a support having a peak-to-peak roughness up to about 0.5 micron with a magnetic medium comprising a layer of the dispersion as the outermost layer with respect to the support,
(c) applying a magnetic field to the medium while it still contains solvent to align the magnetic particles,
(d) removing substantially all solvent within the medium while forming at least 10 percent, by volume, of substantially homogeneously dispersed, discrete, gaseous, non-magnetizable voids, and
(e) compacting the medium to reduce the volume of the voids by at least 15 percent to a final volume of about 8 to 30 percent and to obtain a ratio of the medium thickness to the peak-to-peak roughness of at least 10 and often from 10 to 300 while imparting a surface smoothness, determined as percent contact area, of at least 86 percent to the outermost magnetic recording layer.

23 Claims, 1 Drawing Figure

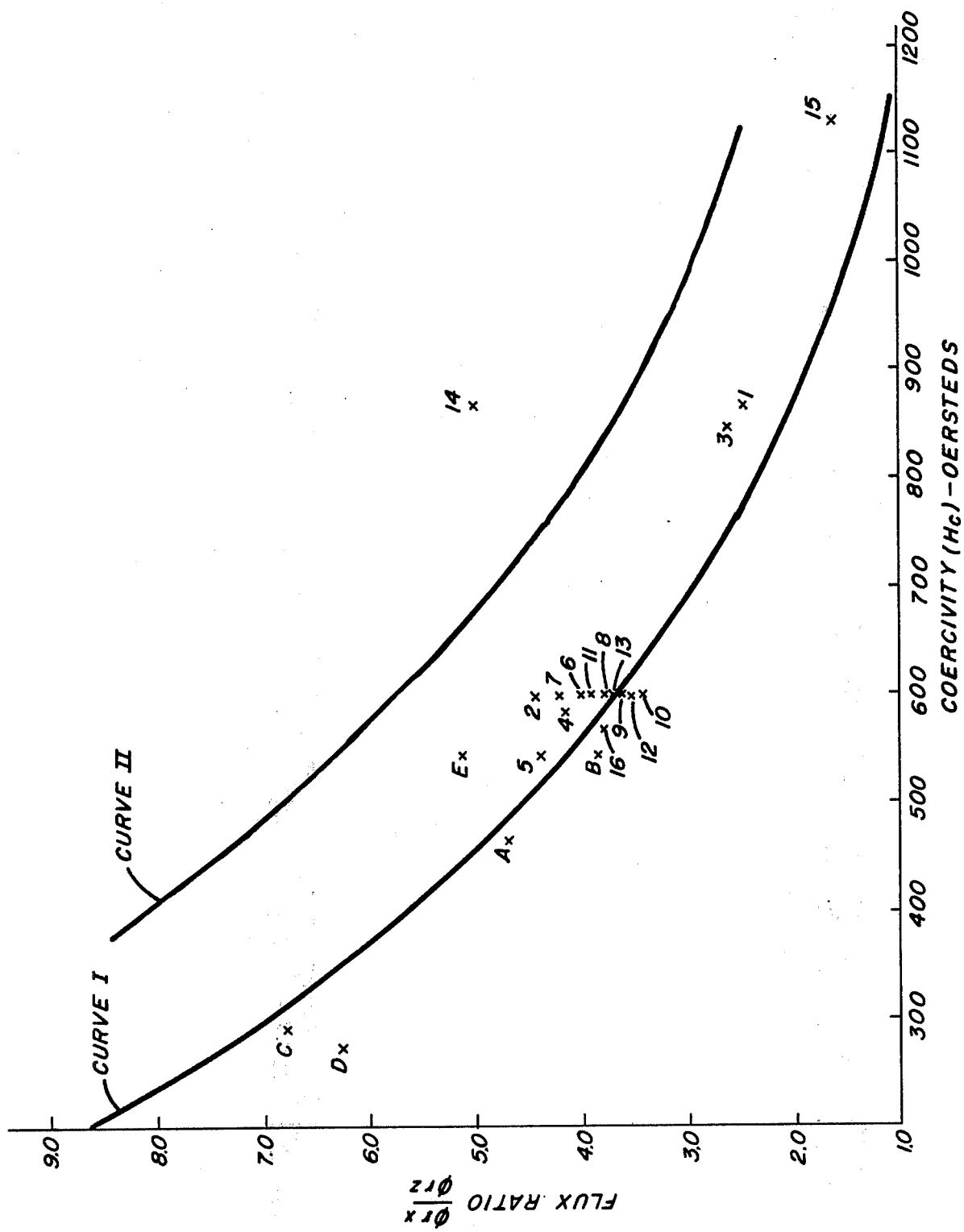

MAGNETIC RECORDING ELEMENTS AND PROCESS OF PREPARATION

BACKGROUND OF THE INVENTION

1. Field of the Invention

This invention relates to magnetic recording elements and processes for preparing such elements. In one of its aspects, this invention relates to magnetic recording elements which combine low modulation noise with high magnetic particle alignment and orientation in the plane of the magnetic layers and processes for preparing such elements. In still another of its aspects, this invention relates to a magnetic recording medium that contains discrete, non-solid voids that are nonmagnetizable, for example air voids, which have been used to provide a recording medium in which the magnetic particles are highly aligned and oriented. Such medium exhibits excellent high frequency output and very low modulation noise in comparison to comparable commercially available prior art materials.

2. Description Relative to the Prior Art

A conventional magnetic recording element comprises a support such as a plastic film, a metal or glass substrate, and a magnetic recording medium containing acicular ferro- or ferrimagnetic particles dispersed in a binder which is commonly a nonmagnetizable polymeric material. As used herein, the term magnetic recording medium is not restricted solely to a medium composed of one or more magnetic recording layers which contain magnetic particles, but can also include the presence of other layers that are coated on the same surface of the substrate with the magnetic recording layer or layers to form a layer composite. Typical of such layers are subbing layers that are used to cause magnetic layers to adhere to the surface of substrates. The magnetic coating which generally constitutes a substantial portion of the magnetic recording medium is commonly applied to the substrate as a dispersion of the ferro- or ferrimagnetic particles in a lacquer comprising the binder in a solvent. The dispersion is applied to a substrate by mechanical means such as extrusion, dipping, screen printing and other molding or casting processes. The solvent is then removed from the coated layer by evaporation or other means, generally using a drying oven.

In the prior art it has generally been considered to be desirable to eliminate, as far as possible, voids, i.e., regions that contain substantially no magnetic recording material, from a magnetic recording medium and especially from those areas in direct association with magnetic pigment. This was a result of the fact that such regions were considered to seriously reduce electrical output of the magnetic medium and to produce output noise signals which have been characterized as modulation noise. Thus, in U.S. Pat. No. 3,240,621, issued Mar. 15, 1966, it is suggested that a desirable recording material requires that the voids content for a magnetic recording layer containing magnetizable particles, be reduced to less than 5 percent, by volume, as compared to a theoretical "void free" coating. See, for example, Col. 2, lines 23-32 of U.S. Pat. No. 3,240,621 which states, "As compared with a theoretically perfect coating containing no voids, the coatings of this invention have less than 10% voids when the magnetic particles are non-oriented (i.e., when no specific steps have been taken to orient the particles in parallel directions), and the coatings have less than about 5% voids when the particles are magnetically oriented in accordance with prior art teachings. These new coatings provide substantially greater total signal voltage output than is obtainable from present commercial coatings."

SUMMARY OF THE INVENTION

It has now been found that voids in a magnetic recording medium can be used to advantage to provide an improved magnetic recording element. Thus, in accordance with this invention, it has been found that a process which includes intially forming a magnetic recording medium having a high void content and slightly reducing the void content of this medium, as described hereinafter, provides a magnetic recording element which exhibits high particle alignment and orientation, high output, particularly at short wavelength, and low modulation noise. As pointed out in detail in the following specification and claims, the aforementioned steps are combined with several other product requirements to obtain the improved magnetic recording elements of this invention. It is significant to note that the magnetic recording elements obtained by the process described herein, in their final manufactured form, exhibit a higher void content than would have generally been considered desirable for short wavelength recording by the prior art, as exemplified by U.S. Pat. No. 3,240,621. It should also be noted that certain commercially available magnetic recording tapes may have one or more of the desirable magnetic and physical properties of the products of this invention, but none of these tapes have the very desirable combination of characteristics and properties of such products. Accordingly, the magnetic recording elements of this invention and their process of preparation are considered to represent a noteworthy contribution to the art.

The present invention includes a magnetic recording element comprising a support having a surface with a peak-to-peak roughness up to about 0.5 micron which surface is coated with a magnetic recording medium having a thickness in the range of 4 to about 20 microns; said medium comprising (1) about 8 to 30 percent, by volume, of discrete, non-solid, non-magnetizable voids substantially homogeneously dispersed therein and (2) aligned and oriented acicular magnetizable particles dispersed in a magnetic recording layer which layer forms a surface of said element and has a surface smoothness, determined as percent contact area, of at least 86 percent, the ratio of said thickness to said peak-to-peak roughness (t/r) being at least about 10. Generally this ratio is from about 10 to 300, often about 20 to 200 and preferably above about 25, e.g., about 50 to 150.

The present invention also includes a process for the manufacture of a magnetic recording element having low modulation noise and high magnetic particle alignment and orientation within the plane of at least one magnetic layer, which process comprises the steps of:

(a) forming a dispersion of acicular magnetizable particles in a solution of binder in solvent, (b) coating a support having a peak-to-peak roughness up to about 0.5 micron with a magnetic medium comprising a layer of the dispersion as the outermost layer with respect to the support, (c) applying a magnetic field to the medium while it still contains solvent to align the magnetic particles, (d) removing substantially all solvent within the medium while forming at least 10 percent, by volume, of substantially homogeneously dispersed, discrete, gaseous, nonmagnetizable voids, and (e) compacting the medium to reduce the volume of the voids by at least 15 percent to a final volume of about 8 to 30 percent and to obtain a ratio of the medium thickness to the peak-to-peak roughness of at least 10 and often from 10 to 300 while imparting a surface smoothness, determined as percent contact area, of at least 86 percent to the outermost magnetic recording layer.

It is well known that a magnetic layer which is still fluid, i.e., contains some solvent, can be subjected to a magnetic field in which the direction of the field is that in which one wants to obtain the maximum output level of the magnetic-recording element. The effect of this is to align acicular magnetizable particles within the layer in such a manner that there is a statistical preponderance of particles that have their main geometric axis and their magnetic axis parallel to the direction of application of the field. Accordingly, in this specification, alignment of the acicular magnetizable particles means that the larger number of these particles are parallel to each other and are parallel to the direction of application of the magnetic field used to obtain such alignment. It is well known that the result of this alignment is an increased efficiency of the magnetic-recording element. In contrast, "orientation" or more specifically "coplanar orientation," as used herein, in reference to the magnetizable particles, means the orientation of these particles in recording-layer planes that are parallel to the plane of the support of the magnetic-recording element. It is known that, after application of a magnetic layer to a support and treatment of this layer by a magnetic field, acicular magnetizable particles within such layer display a certain degree of coplanar orientation. It is a characteristic of the improved magnetic-recording elements of this invention that the compression of the porous magnetic layer results in an unexpectedly high degree of coplanar orientation of the magnetizable acicular particles.

BRIEF DESCRIPTION OF THE DRAWING

The drawing shows the relationship of the flux ratio ($\phi_{rx}/\phi_{rz}$) to coercivity ($H_c$) in Oersteds for representative magnetic recording elements of this invention and for comparable magnetic recording elements which do not have the combination of porosity, support surface roughness, recording medium thickness, recording medium surface smoothness, and ratio of recording medium thickness to support surface roughness which characterize the magnetic recording elements of this invention.

Curve I in the drawing is defined by the equation $\log_{10}(\phi_{rx}/\phi_{rz}) = 1.13 - (Hc/1050)$. Curve II in the drawing is defined by the equation $\log_{10}(\phi_{rx}/\phi_{rz}) = 1.20 - (Hc/1360)$. The points that are identified by numbers have been numbered to correspond to Examples in the following disclosure wherein magnetic recording elements having the flux ratio and coercivity represented by such points were prepared. Points A–E, inclusive, correspond to comparable high quality commercially available elements, as set forth and identified in the following Table III.

DESCRIPTION OF SPECIFIC EMBODIMENTS

The magnetic recording medium comprises at least one magnetic recording layer which forms the outer surface of the magnetic recording element. As previously indicated herein, this magnetic recording layer can be the sole layer in the medium but other layers such as subbing layers, antistatic layers and other magnetic or non-magnetic pigment containing layers can also be present in the medium.

The non-solid voids are formed within the medium while substantially all binder solvent is removed from within the medium. These non-solid voids contain entrapped gas such as air and/or entrapped liquid such as liquid lubricant for the magnetic recording layer. Such non-solid voids are formed by compacting a magnetic medium which is porous and contains gaseous voids, i.e., voids which are wholly or only partially filled with entrapped gas and are compressible.

The non-solid voids present in the magnetic recording media according to this invention are voids in a magnetic sense, i.e., they are regions of substantially no magnetic density and are referred to herein as "non-solid, non-magnetizable voids." Such voids are non-solid since the medium in which they are found is formed by compacting a medium which is more porous, e.g., one which contains at least 10%, by volume, of discrete, gaseous, non-magnetizable voids and often as much as 50 percent, by volume, of such voids. In practicing this invention, the void content of this more porous medium is reduced, for example, by calendering, by at least 15 percent, preferably 20 percent or more, and generally about 30 to 80 percent. For example, a suitable porous "starting medium" has a gaseous void content of about 35 percent, by volume, which is reduced by 60 percent to obtain a final void content of about 14 percent, by volume.

The non-solid content of the magnetic recording medium, which for the elements of this invention is in the range of about 8 to 30 percent, by volume, can be readily determined using any suitable means. One method is described in U.S. Pat. No. 3,240,621 issued Mar. 15, 1966. At column 4, lines 48 et seq. of that patent, it is pointed out that the density of a magnetic medium coated on a substrate can be found experimentally from measurements of weight, area and thickness. As disclosed in the patent, a small piece of coated tape of known area and thickness is weighed, for example, and its weight and thickness are again measured after the magnetic coating has been removed, e.g., by solvents. The weight and thickness of the coating itself are then found by difference, and the density of the coating determined using the relationship:

$$\text{Density} = \frac{\text{weight of coating}}{\text{area} \times \text{thickness of coating}}$$

The theoretical density of a coating comprising two components can be determined from the relationship:

$$\text{Density} = \frac{100 d_1}{W_1 + \frac{W_2 d_1}{d_2}}$$

where $W_1$ and $d_1$ are respectively the percent, by weight, and density of the first components and $W_2$ and $d_2$ have similar meaning for the second component.

Assuming a void-free coating, a theoretical maximum density for a coating can be calculated using a value of 4.98 gm/cm$^3$ for the density of $\gamma Fe_2O_3$, based on the molecular weight of the oxide and the size of the crystallographic unit cell. For a coating comprising 75 percent, by weight, of $\gamma Fe_2O_3$ and 25 percent of a binder comprising cellulose acetate butyrate, "Acryloid B-72" (a commercial acrylic ester resin sold by Rohm & Haas) and tricresyl phosphate, and having a density of 1.188 gm/cm$^3$ a maximum void-free theoretical density of 2.77 gm/cm$^3$ is calculated. From comparisons of this theoretical value with experimentally determined density measurements, an evaluation of the percent of voids in the coating can be made. Similar measurements can be made using other acicular magnetizable particles, pigments, binders and addenda in the coating.

The relatively more porous magnetic recording medium that is subjected to compaction, densification or compression in the practice of the invention can be formed by any suitable coating technique. For example, such a magnetic recording medium having the desired porosity can be coated using methods known in the prior art such as roll coating, knife-coating, gravure-offset coating or extrusion coating. Two or more layers of the magnetic recording medium can be coated simultaneously or they can be coated separately with drying and curing between the applications of successive layers. A preferred method according to the practice of this invention is extrusion coating. Techniques known to those skilled in the art which can be used to obtain the desired porosity include (1) the use of acicular particles and high ratios of binder solvent to magnetizable particles or to particles plus binder in the coating dispersion, (for example, use of about 10 times or more of binder solvent, by weight, to magnetizable particles in the coating dispersion), (2) the use in the dispersion of a mixture of liquids which, taken separately are not solvents for the binder used in a layer, but when mixed are excellent solvents and are such that the evaporation of one of the constitutents during drying leads to a fine and progressive precipitation of a part of the binder and (3) the use, in a coating dispersion of a mixture of polymers as the binder which polymers are dissolved in a mixture of liquids that upon drying progressively precipitate one of the polymers more rapidly than the other to provide a porous structure in the layer. Before compacting, the more porous medium generally has a thickness up to about 25 microns and often about 5 to 15 microns.

To obtain a high signal and low noise it is known that the dispersion of acicular magnetizable particles in a solution of binder in solvent used in forming a magnetic medium must be homogenous since these magnetic particles tend to form agglomerates upon coating. Such agglomerates are known to result in undesirable magnetic discontinuities and result in noise. To avoid the formation of these aggregates, coating dispersions, including those employed in the practice of this invention, are generally subjected to shear after preparation and prior to coating. Many suitable techniques are known which will avoid agglomeration of magnetic particles and/or the formation of binder "slugs" that result in undesirable modulation noise. Any of these techniques can be employed to achieve the substantially homogenous dispersion of magnetizable particles in the magnetic recording medium used in this invention.

When forming the dispersion of acicular magnetizable particles in a solution of binder in solvent referred to previously herein, it is preferable to avoid, as much as possible, breaking of such particles. This can be accomplished by careful milling procedures which are well known to those skilled in the art. Upon evaporation of the solvent, the acicular particles are encapsulated within the binder to form a matrix or skeleton which facilitates the formation of voids in the magnetic recording medium. In subsequent compacting of the magnetic recording medium as taught herein, some breaking of the magnetic particles can occur as the matrix or skeleton is compressed and the binder encapsulating the particles partially restricts their mobility. However, we have observed that the degradation in output and modulation noise is so minor when a more porous layer is compressed to a less porous layer, as described herein, that the overall performance of the magnetic recording element is actually substantially improved by the subsequent compacting. We believe that such unexpectedly good performance results from the fact that the fragments of any particles broken by compacting porous layers, as described herein, remain in approximately the same relative position one to the other, in very close proximity and without any binder film within the fracture, so that the fragments are constrained by their interaction fields to respond essentially as a single magnetic particle.

In practicing this invention, it has been found advantageous to add a binder to the magnetic coating dispersion in two stages during the ball milling operation. For example, a suitable dispersion for coating by extrusion methods can be formed by initially dispersing the acicular magnetizable particles in about 65 to about 90 percent, by weight, of the total weight of binder required in the final coating composition, together with solvent for the binder. Subsequently, additional binder such as a polymeric binder in solvent is added to said dispersion to obtain a viscosity up to about 100 cps., generally about 55 to about 90 cps. U.S. Pat. No. 3,728,262 issued Apr. 17, 1973, discloses the preparation of a dispersion in which a solution of polymeric binder in a solvent is obtained in a first stage and then a second binder is added to the dispersion in a second stage. The second binder need not be the same polymer as that which is used in preparing the initial dispersion. As pointed out in that patent, such a technique makes it possible to eliminate the low molecular weight dispersing agents which generally have a detrimental effect on the quality of layers coated from dispersions containing them.

The coating compositions or dispersions described herein are highly viscous and generally thixotropic or non-Newtonian fluids which makes it somewhat difficult to determine their viscosity. The apparent viscosity of such compositions is a function of the shear rate at which the viscosity is measured. Therefore, the viscosities described herein are determined on a Ferranti-Shirley viscometer taking those values attributable to high shear, i.e., 800 sec.$^{-1}$ to 1200 sec.$^{-1}$. Unless otherwise indicated to the contrary, the temperature used in these viscosity determinations is approximately 25° C.

After the dispersion of acicular, magnetizable particles in a solution of binder and solvent is formed it is coated onto a support to form the outermost layer with respect to the support. The dispersion can be coated directly on the support or it can be coated over other layers to form the magnetic recording medium. The acicular, magnetizable particles are aligned in the still wet fluid layer, i.e., the layer still containing solvent, after it is applied to the support. This alignment can be accomplished by conventional means such as applying a magnetic field to the magnetic recording layer while it still contains solvent and the acicular particles are sufficiently movable therein to be aligned. In practicing this invention, the solvent is substantially eliminated from the layer while forming a porous magnetic recording medium containing at least about 10 percent, and often 35 percent, or more, by volume of discrete, gaseous, nonmagnetizable voids. The porous medium is then compacted, as described herein, to compress these gaseous voids and reduce the void content by at least about 15 percent. The high void content of the porous medium aids in further alignment and coplanar orientation of the acicular magnetizable particles in the medium during compacting. As a result, the magnetic recording elements of this invention, in comparison to comparable commercially available prior art magnetic recording elements exhibit a significantly increased particle alignment and orientation within the plane of the magnetic recording layer or layers.

The high degree of magnetic particle alignment and orientation exhibited by the magnetic recording elements of this invention is shown by their flux ratio, i.e., their $\phi_{rx}/\phi_{rz}$. This flux ratio represents the proportion between the values of the remanent magnetization measured in the lengthwise direction within the plane of the magnetic medium (the preferred direction of alignment or orientation of the acicular magnetizable particles) ($\phi_{rx}$) and the remanent magnetization measured in the direction perpendicular to said plane ($\phi_{rz}$). The high flux ratios exhibited by the elements of this invention represent a significant advantage in that the horizontal component of the magnetic recording field in proximity to the point of output of the magnetic recording head has more influence on the final remaining magnetization than the vertical component which, consequently, decreases the effects of phase rotation. Attainable values of the flux ratio are found to be a function of coercivity. Also, the nature of the magnetic particles will influence the flux ratio and only comparisons of flux ratios of like magnetic materials, e.g., gamma ferric oxides, can be considered to provide meaningful comparisons. The drawing shows that magnetic recording elements of this invention where the magnetizable particles are acicular gamma ferric oxide particles (points 1-8 and 15) give values that plot above Curve I. In contrast, comparable commercial prior art magnetic recording elements employing acicular gamma ferric oxide particles (points A-D, inclusive) give values that plot below Curve I. Similarly, gamma ferric oxide containing magnetic recording elements prepared in the following Examples 9, 10, 12 and 16 for comparative purposes (points 9, 10, 12 and 16) plot below Curve I. While gamma ferric oxide containing magnetic recording elements prepared in the following comparative examples 11 and 13 plot above Curve I, it can be seen from the data reported in Table II that their relatively high flux ratios are obtained at a substantial sacrifice in output and modulation noise. Accordingly, Curve I, and the equation defining Curve I, can be used to aid in characterizing the improved magnetic recording elements of this invention which employ gamma ferric oxide, doped or undoped, as the magnetizable particles in the magnetic recording mediums. Thus, the flux ratios of such improved magnetic recording elements where the magnetizable particles are gamma ferric oxide, doped or undoped, are at least equal to the flux ratio determined according to the equation $\log_{10}(\phi_{rx}/\phi_{rz}) = 1.13 - (Hc/1050)$ where Hc is the coercivity of the magnetic recording layer in Oersteds.

The drawing also shows that a magnetic recording element of this invention where the magnetizable particles are acicular ferrous ferric oxides (point 14) gives a value that plots above Curve II. In contrast, a comparable commercial prior art magnetic recording element employing acicular ferrous ferric oxide particles (point E) gives a value that plots below Curve II. Accordingly, Curve II, and the equation defining Curve II, can be used to aid in characterizing the improved magnetic recording elements of this invention which employ ferrous ferric oxide, doped or undoped, as the magnetizable particles in the magnetic recording medium. Thus, the flux ratios of such improved magnetic recording elements where the magnetizable particles are acicular ferrous ferric oxide, doped or undoped, are at least equal to the flux ratio determined according to the equation: $\log_{10}(\phi_{rx}/\phi_{rz}) = 1.20 - (Hc/1360)$ where Hc is the coercivity of the magnetic recording layer in Oersteds. It should be understood that the magnetic recording elements of this invention which have the combination of characteristics described previously herein and are prepared according to the teachings set forth herein, will have points corresponding to flux ratios which lie on or above the appropriate curve. The high flux ratios characteristic of the magnetic recording elements of this invention result, at least in part, from the additional mechanical orientation obtained through compacting or densifying the porous magnetic recording medium, as described herein, and particle alignment obtained from submitting the layer to a magnetic field before drying. The voids in the porous layer aid in and allow further alignment and orientation of the acicular magnetizable particles. This compacting or densification of the porous medium can be achieved using any suitable means before the binding agent employed in coating the medium has lost its thermoplastic character. One method of compacting the porous magnetic recording medium, whether it is a single magnetizable layer or a layer composite containing additional nonmagnetizable layers, is to calender the dry magnetic recording medium (before the binding agent has lost its thermoplastic character) between very smooth, hard steel rolls or between a very smooth, hard steel roll and a cotton roll with the steel roll in contact with the magnetic recording medium. The magnetic recording medium can be subjected to calendering several times and it is preferably heated to facilitate compacting. In the prior art, calendering is generally considered to be simply a surface finishing process, much like brushing. However, in the practice of this invention, calendering assists in the orientation of the magnetizable particles and goes beyond simple surface finishing operations. In a calendering operation any suitable pressure and temperature to effect compacting can be employed as will be obvious to those skilled in the art. As an alternative to calendering, the magnetic recording medium can be compressed or compacted by using binders which upon application of heat will shrink to form a more compact, i.e., a less porous magnetic recording medium.

In addition to their high magnetic effectiveness in the direction of magnetic particle alignment and orientation (as shown by their ratio $\phi_{rx}/\phi_{rz}$); the magnetic recording elements of the invention that employ doped acicular magnetizable particles, particularly cobalt doped, also exhibit increased magnetic vectors within the plane of the magnetic recording medium and at right angles to the direction of particle alignment in comparison to comparable prior art magnetic recording elements. This feature of these elements can be extremely useful in such applications as quad video recording where there are recordings made in both the x and y directions ("lengthwise" and "transverse" directions, respectively) of a magnetic tape.

It is known that the smoothness of the surface of a magnetic recording element is very important in obtaining good signal reproduction, particularly at short wavelengths, because the magnetic flux decreases greatly as the distance separating the recording head and the magnetic layer increases. Furthermore, inadequate coupling between the recording head and the magnetic recording layer increases the noise level and also increases abrasion of the recording head. This invention provides a means for obtaining a magnetic recording element containing a magnetic recording layer which forms a surface of the element and exhibits exceptional surface smoothness. Compacting a porous magnetic medium according to the teachings of this invention imparts an extremely smooth surface to the medium. This smoothness can be expressed in terms of "percent contact area." This "percent contact area" is determined with relation to a reference surface consisting of the hypotenuse surface of a transparent prism. The value of an incident luminous flux directed for total reflection from the hypotenuse is equal to $\phi$. The flux reflected by the hypotenuse surface is, therefore, equal to $\phi$ but is reduced and becomes equal to $\phi'$ when one places an absorber in optical contact with the hypotenuse. A sample of the magnetic element being measured, when contacted under controlled pressure against the surface (with the outermost magnetic recording layer of the element in contact with the surface) produces light absorption that increases as the smoothness of the magnetic recording layer increases. The "percent contact area" is equal to $(\phi-\phi'/\phi)\times 100$. The value of the "percent contact area" increases with the flatness of the surface of the magnetic recording layer, i.e., with the surface smoothness of the layer. The magnetic recording elements obtained according to the practice of this invention exhibit a surface smoothness, determined as "percent contact area" of at least about 86 percent and often up to 88 percent, 90 percent or more. Furthermore, the surface of such elements are very low in abrasiveness. Thus, in comparison to prior art elements having a comparable percent contact area, e.g., 86 percent, the elements of this invention exhibit a significantly lower abrasivity. The magnetic recording media, after compacting as disclosed herein, generally are 4 to about 20 microns thick, often 4 to about 12 microns thick and preferably about 5 to 12 microns thick. Prior to this invention, such thicknesses were generally considered to be excessive for and detrimental to high quality magnetic recording at short wavelengths. However, the magnetic recording elements of this invention exhibit excellent short wavelength recording characteristics. It has been found that the relatively thicker magnetic recording medium aids in improving the surface smoothness of the magnetic recording layer because it reduces reproduction of roughness from the surface of the support which results when a thinner, less porous magnetic recording medium is coated on the support.

As previously indicated herein, the magnetic recording elements of this invention exhibit high output at short wavelengths. It should be noted, however, that this is accomplished without sacrificing output at longer wavelengths. Thus, in this invention, the high surface smoothness of the magnetic recording medium, the high alignment of particles, the high orientation of the acicular magnetizable particles obtained by compacting a more porous medium and the thicker magnetic recording medium, which reduces reproduction of support surface roughness, all combine to give efficient short wavelength response from the portion of the magnetic recording layer near its surface without sacrificing longer wavelength response from the lower portion of that layer.

The magnetic particles dispersed in the recording layers of this invention are acicular magnetizable particles such as ferro- and ferri-magnetic particles. Typical acicular particles include, for example, particles of ferro- and ferri-magnetic iron oxide, both the black oxide of ferrous ferric oxide, as well as the brown gamma ferric oxide, complex oxides of iron and cobalt, chromium dioxide, various ferrites and the like. Acicular gamma ferric oxides or ferrous ferric oxides, which can be undoped or can contain doping metal ions, are preferred materials. Particularly, suitable acicular ferromagnetic iron oxides of this type are disclosed in French Pat. No. 2,129,841 and French Pat. No. 2,199,155. The particles are acicular and generally have an acicularity ratio above about 5 and preferably acicularity ratios that are 15 or more. The particles can be doped with one or more ions of a polyvalent metal such as cobalt, nickel, zinc, manganese, chromium, or the like. The concentration of dopant ion employed is subject to variation, depending on such things as size of the magnetic particles. However, dopant levels in the range of about 1 to about 6 percent, by weight, often about 1 to 3 percent, particularly with cobalt ion, are suitable. The particle sizes of these acicular ferro- or ferri-magnetic particles are generally quite small with their major axes being up to about 1.5 microns, often about 0.3 to 1, preferably about 0.3 to 0.9 micron. The coercivity ($H_c$) of the particles is subject to wide variation, but is preferably at least 450 Oe and often in the range of about 450 to 1200 or 2000 Oe.

The binders that can be used to homogeneously disperse the magnetizable particles employed in the practice of this invention and which can also be used in other layers which may be present in the magnetic recording medium include any of the binders well known for the manufacture of such layers. Typical binders are polymeric binding agents such as copolymers of vinyl acetate with vinyl chloride, copolymers of vinylidene chloride with acrylonitrile, copolymers of acrylic and-/or methacrylic esters, polyvinyl-butyral, copolymers of butadiene with styrene, terpolymers of acrylonitrile, vinylidene chloride and maleic anhydride, cross-linked or non-cross-linked, homopolymers or copolymers such as polyamide, polyurethanes, polyesters, and the like, as well as mixtures of these binders. Good results can be obtained with a copolymer of vinyl acetate with vinyl chloride, partially hydrolyzed, and possibly cross-linked by an isocyanate or similarly reactive constituent, or by using polyurethanes or a mixture of these binders. The amount of binder employed with respect to the magnetizable material in a magnetic recording layer in an element of this invention is generally in the range of about 10 percent to about 40 percent, by weight, of magnetizable material and preferably from about 15 percent to about 25 percent, by weight, thereto.

The magnetic recording media described herein can be applied to a wide variety of non-magnetizable supports, including discs, belts, paper or film, and the like. Suitable supports can be subbed by known methods, are generally flexible and typically include such materials as cellulose nitrate film, cellulose acetate film, polyvinyl acetal film, polystyrene film, polyester such as poly(ethylene terephthalate) film, which can be biaxially or asymmetrically stretched, polycarbonate film, and related films or resinous materials, as well as papers, metals such as aluminum or brass, and the like. The thickness of the support is subject to variation, however; suitable supports generally have a thickness in the range of about 4 to about 150 microns, often in the range of about 6 to about 38 microns and preferably in the range of about 12 to about 25 microns. In order to achieve the objectives of this invention, the support surface coated with the magnetic recording medium has a surface roughness which does not exceed 0.5 micron peak-to-peak. It is particularly desirable to employ a support having a peak-to-peak surface roughness which is up to about 0.3 micron and preferably about 0.1 micron or less. This surface roughness can be determined by any conventional means suitable for this purpose. For example, a Bendix Proficorder employing a 2.5 mil diamond stylus and a suitable stylus loading to avoid surface distortion can be used for this purpose.

In practicing this invention the ratio of the thickness of the magnetic recording medium to the peak-to-peak roughness of the support is at least about 10, generally in the range of about 10 to 300, often about 20 to 200 and preferably about 50 to 150. Thus, the magnetic recording medium is generally at least 10 times as thick as the peak-to-peak roughness of the support. As previously indicated herein, the use of a magnetic recording medium which falls within the aforementioned ratio improves the surface smoothness of the magnetic recording layer because it reduces possible reproduction of roughness from the support surface.

Suitable solvents that can be employed in the preparation of the layer or layers present in the magnetic recording media used in the practice of this invention include organic materials such as methyl ethyl ketone, methyl isobutyl ketone, ethyl acetate, butyl acetate, cyclohexanone, butyl alcohol, methylene chloride, tetrahydrofuran dioxane, dimethylformamide and the like as well as mixtures thereof. The magnetic recording layers used in the elements described herein can contain other additives such as lubricants and the like as would be obvious to those skilled in the art.

The invention is further illustrated by the following Examples of its practice. Examples 9–13 and 16 involve conditions which are outside of those required for this invention and are included for comparison purposes. Table III sets forth relevant data for several commercially available tapes and is also included for comparison purposes. In the following Examples, including Tables I and II, the parts are, unless otherwise indicated, expressed in parts by weight.

EXAMPLES 1–16

The magnetic recording elements for these examples were prepared using the compositions and procedures set forth in Tables I and II which follow. The magnetic oxide particles employed in these examples had crystal lengths of 0.7 to 0.8 micron and acicularity ratios of 25–30. In these runs a magnetic dispersion in solvent was initially charged (Initial Mill Charge) to a ball mill and milled for the period of time indicated. Additional solvent and binder was added (Second Mill Charge) to the dispersion and milling was continued.

4 parts, by weight, of oleylamide oleate (commercially available from Pierreffite-Auby as Inipol) was added to the resulting dispersion and the dispersion was coated by extrusion hopper onto a poly(ethylene terephthalate) support subbed with copoly(vinylidene chloride acrylonitrile polymer) to form a magnetic recording medium as described in Table II. Prior to drying the still wet coating was passed through a magnetic field of 2000 Oe to align the magnetic particles.

While the binder was still in a thermoplastic condition, the dried layer was calendered until its thickness and porosity were reduced as shown in Table II.

The properties of the magnetic recording elements obtained were measured and the results reported in Table II. Conventional procedures were used in making the measurements with the following specific test conditions:

| MEASUREMENTS PROCEDURES | | |
|---|---|---|
| 1. Measurement Conditions | | |
| Tape recorder | | Honeywell 7600 |
| Linear speed of the tape | in/sec | 60 (150 cm/sec.) |
| Recording gap | microns | 3.5 |
| Playback gap | micron | 0.5 |
| Track width | in | 0.050 |
| 2. Modulation Noise | | |
| Recorded signal | | Sine wave at 10 kHz frequency |
| Record level | | +10 dB |
| Analysis of reproduction | | Wave analyzer plot |
| | | From 8 kHz to 12 kHz |
| Evaluation | | Modulation noise is the difference in dB between the level of the signal and the average value of the noise pedestal surrounding the base of the peak. |
| 3. Signal Level (Output) | | The bias is increased while monitoring the output at 2 MHz, until the maximum output is observed. Then the bias is further increased until the output at 2 MHz is reduced to 2 dB below the maximum. |
| | | The recording current at the operating bias is increased until the output of a 200 kHz sine wave recording contains 1% of the third harmonic (600 kHz). |
| | | The output levels are expressed in dB with respect to 1 mV at the terminals of the playback head. |

TABLE I

PREPARATION PROCEDURE

| Example No. | | 1 | 2 | 3 | 4 | 5 | 6 | 7 | 8 |
|---|---|---|---|---|---|---|---|---|---|
| Initial Mill Charge | | | | | | | | | |
| Coercivity of the magnetic element Oe | 865 | 600 | 850 | 585 | 550 | 600 | 600 | 600 | |
| Type | | ← ← gamma ferric oxide doped with cobalt → → | | | | | | | |
| Cobalt % by weight | | 3 | 2 | 3 | 2 | 2 | 2 | 2 | 2 |
| Parts | | 200 | 200 | 200 | 150 | 200 | 200 | 200 | 200 |
| Binder[1] | Parts | 30 | 30 | 30 | 15 | 30 | 30 | 30 | 30 |
| Plasticizer[2] | Parts | 2 | 4 | 4 | 0 | 4 | 4 | 4 | 4 |
| Methyl isobutyl ketone[3] | Parts | 180 | 180 | 180 | 300 | 180 | 180 | 180 | 180 |
| Initial Mill Cycle | | | | | | | | | |
| Volume of the mill | Liters | 1000 | 1000 | 1000 | 1 | 1000 | 1 | 1 | 1 |
| Duration of milling | Hours | 168 | 168 | 168 | 120 | 168 | 168 | 168 | 168 |
| Second Mill Charge | | | | | | | | | |
| Binder | Parts | 10 | 10 | 10 | 15 | 10 | 10 | 10 | 10 |
| Plasticizer[2] | Parts | 2 | 4 | 4 | 2 | 4 | 4 | 4 | 4 |
| Methyl isobutyl ketone[3] | Parts | 148 | 148 | 148 | 50 | 148 | 148 | 148 | 148 |
| Duration of milling | Hours | 48 | 48 | 48 | 48 | 48 | 48 | 48 | 48 |
| Polyester-tape support | | 23 | 19 | 19 | 22 | 23 | 19 | 19 | 19 |
| thickness μ | | <0.1 | 0.1 | 0.1 | <0.1 | <0.1 | 0.1 | 0.1 | |
| Roughness, peak to peak μ | | | | | | | | | |
| Calendering Rolls Composition | | steel/cotton | steel/cotton | steel/cotton | steel/cotton | steel/cotton | steel/cotton | steel/cotton | steel/cotton |
| Temperature | °C. | 85 | 85 | 86 | 30 | 85 | 85 | 85 | 85 |
| Force | Kg/cm | 240 | 240 | 240 | 400 | 240 | 240 | 240 | 240 |

| Example No. | | 9 | 10 | 11 | 12 | 13 | 14 | 15 | 16 |
|---|---|---|---|---|---|---|---|---|---|
| Initial Mill Charge | | | | | | | | | |
| Coercivity of the magnetic element Oe | | 600 | 600 | 600 | 600 | 600 | 870 | 1130 | 570 |
| Type | | ← gamma ferric oxide → doped with cobalt | | | ferrous ferric ← oxide | | cobalt doped ferric oxide → | | |
| Cobalt % by weight | | 2 | 2 | 2 | 2 | 2 | 2.3 | 4 | |
| Parts | | 200 | 200 | 200 | 200 | 200 | 200 | 200 | 200 |
| Binder[1] | Parts | 30 | 30 | 30 | 30 | 30 | 30 | 30 | 30 |
| Plasticizer[2] | Parts | 4 | 4 | 4 | 4 | 4 | 4 | 4 | 4 |
| Methyl isobutyl ketone[3] | Parts | 180 | 180 | 180 | 180 | 180 | 180 | 180 | 180 |
| Initial Mill Cycle | | | | | | | | | |
| Volume of the mill | Liters | 1 | 1 | 1 | 1 | 1 | 500 | 1 | 1 |
| Duration of Hours | HOurs | 168 | 168 | 168 | 168 | 168 | 168 | 168 | 168 |
| Second Mill Charge | | | | | | | | | |
| Binder | Parts | 10 | 10 | 10 | 10 | 10 | 10 | 10 | 10 |
| Plasticizer[2] | Parts | 4 | 4 | 4 | 4 | 4 | 4 | 1 only, 4 | |
| Methyl isobutyl ketone[3] | Parts | 148 | 148 | 148 | 148 | 148 | 148 | 148 | 148 |
| Duration of milling | Hours | 48 | 48 | 48 | 48 | 48 | 48 | 48 | 48 |
| Polyester-tape support | | | | | | | | | |
| Thickness μ | | 19 | 23 | 23 | 23 | 23 | 23 | 23 | |
| Roughness, peak to peak μ | | 0.1 | 0.8 | 0.8 | 0.8 | 0.8 | <0.1 | <0.1 | <0.1 |
| Calendering Rolls Composition | | steel/cotton | steel/cotton | steel/cotton | steel/cotton | steel/cotton | steel/cotton | steel/steel | steel/steel |
| Temperature | °C. | 85 | 85 | 85 | 85 | 85 | 85 | 85 | 85 |
| Force | Kg/cm | 240 | 240 | 240 | 240 | 240 | 240 | 240 | 240 |

COMMENTS
[1] Copolymer of vinyl chloride and vinyl acetate, partially hydrolyzed. Suitable products are sold under the trade name Vinnol by Wacker Chemie, and under the trade name VAGH by Union Carbide Corp.
[2] Octyl epoxy stearate. Suitable products are sold under the trade name Edenol by Henckel, and under the trade name Ecepox by Ugine-Kahlman.
[3] One makes slight modifications of the quantity of solvent from one batch to the other so as to maintain the viscosities constant, as it is obvious for the skilled in the art.
[4] For Example 1only, the initial load of the grinder also contained 8 parts of ethyl cetyl carbonate, 8 parts of colloidal alumina (average size of the particles 0.03 micron) and 1 part of alpha alumina (average size of the particles 0.3 micron). Also, in Example 1, no oleylamide oleate was added prior to coating.

TABLE II

PROPERTIES OF THE MAGNETIC-RECORDING PRODUCTS

| Example No. | | 1 | 2 | 3 | 4 | 5 | 6 | 7 | 8 |
|---|---|---|---|---|---|---|---|---|---|
| 1. Coercivity Oe | | 865 | 600 | 850 | 585 | 550 | 600 | 600 | 600 |
| 2a. Thickness of the layer prior to compacting. | μ | 7.6 | 7.45 | 11.16 | 10.54 | 14.70 | 12.88 | 11.22 | 7.43 |
| 2b. Thickness of the layer after compacting.[e] | | 7.2 | 6.2 | 9.2 | 7.9 | 11.5 | 9.65 | 8.34 | 5.62 |
| 3. Density of oxide in the coating | g/cm$^3$ | 1.65 | 1.90 | 1.76 | 2.01 | 2.18 | 2.06 | 2.03 | 1.97 |
| 4a. Percentage of voids prior to | | 35.7 | 31 | 34 | 37 | 30 | 31.6 | 32.9 | 33.8 |

TABLE II-continued
PROPERTIES OF THE MAGNETIC-RECORDING PRODUCTS

| | | | | | | | | | |
|---|---|---|---|---|---|---|---|---|---|
| | compacting | −% | | | | | | | |
| 4b. | Percentage of voids after compacting | −% | 26.8 | 14.4 | 21.0 | 9 | 14 | 8 | 9 | 12 |
| 4c. | Percentage of reduction of voids | −% | 25 | 51 | 38 | 76 | 55 | 74 | 72 | 64 |
| 5. | Smoothness of the magnetic-layer surface | −% | 90 | 88 | 89 | 89 | 86 | 88 | 88 | 87 |
| 6. | Roughness of the support (peak to peak) | μ | <0.1 | 0.1 | 0.1 | <0.1 | <0.1 | 0.1 | 0.1 | 0.1 |
| 7. | t/r | | >72 | 62 | 92 | >80 | >120 | 96 | 80 | 56 |
| 8. | Flux ratio: φrx /φrz | | 2.44 | 4.35 | 2.56 | 4.13 | 4.28 | 3.97 | 4.14 | 3.72 |
| 9. | Output level at 0.75 μ dB | | −34 | −35 | −32.5 | −31.5 | −35 | −30.5 | −32.5 | −33.5 |
| 10. | Modulation noise dB | | −62 | −58 | −65 | −57 | −57 | −61 | −57 | −55 |

| Example No. | | | 9 | 10 | 11 | 12 | 13 | 14 | 15 | 16 |
|---|---|---|---|---|---|---|---|---|---|---|
| 1. | Coercivity Oe | | 600 | 600 | 600 | 600 | 600 | 870 | 1130 | 570 |
| 2a. | Thickness of the layer prior to compacting. | | | | | | | | | |
| 2b. | Thickness of the layer after compacting.(e) | μ<br>μ | 3.58<br>2.77 | 13.13<br>10.36 | 11.10<br>8.48 | 7.77<br>5.69 | 3.63<br>2.78 | 8.8<br>7.31 | 7.4<br>5.15 | 5.4<br>4.78 |
| 3. | Density of oxide in the coating | g/cm³ | 2 | 1.97 | 2 | 2.03 | 1.93 | 1.90 | 2.07 | 2.31 |
| 4a. | Percentage of voids prior to compacting | −% | 31.1 | 31.1 | 32 | 33.8 | 34.2 | 29.8 | 33 | 12.7 |
| 4b. | Percentage of voids after compacting | −% | 10 | 12 | 10 | 9 | 13 | 83 17 | 15.5 | 1.7 |
| 4c. | Pecentage of reduction of voids | −% | 67 | 61 | 68 | 73 | 62 | 43 | 50 | 87 |
| 5. | Smoothness of the magnetic-layer surface | −% | 78 | 85 | 85 | 81 | 65 | 86 | 89 | 89 |
| 6. | Roughness of the support (peak to peak) | μ | 0.1 | 0.8 | 0.8 | 0.8 | 0.8 | <0.1 | <0.1 | <0.1 |
| 7. | t/r | | 28 | 13 | 10 | 7 | 3.5 | >73 | >54.5 | >47.0 |
| 8. | Flux ratio: φrx /φrz | | 3.58 | 3.40 | 3.94 | 3.52 | 3.69 | 5.0 | 1.61 | 3.81 |
| 9. | Output level at 0.75 μ dB | | −39.5 | −37 | −37 | −38 | −50 | −37 | −30.5 | −35.5 |
| 10. | Modulation noise dB | | −50 | −47 | −47 | −47 | | −62 | −59.5 | −55 |

TABLE III

| Sample | | | C | D' | B | A | E |
|---|---|---|---|---|---|---|---|
| 1. | Coercivity of the magnetic element Oe<br>Type | | 295 | 275 | 530 | 470 | 550 |
| | | | ← gamma ferric oxide doped with → cobalt | | | Ferrous ferric oxide → doped with cobalt | |
| 2. | Thickness of the layer after compacting(f) | μ | 5.6 | 5.0 | 3.0 | 3.0 | 5.7 |
| 3. | Density of coating | | 1.52 | 1.51 | 2.13 | 2.24 | 1.60 |
| 4. | Smoothness of the magnetic-layer surface | % | 69 | 80 | 86 | 86 | 83 |
| 5. | Surface roughness of the support (r) peak to peak | μ | 0.15 | 0.10 | 0.10 | 0.10 | 0.25 |
| 6. | Ratio t/r | | 37 | 50 | 30 | 30 | 22.8 |
| 7. | Flux ratio: φrx/φrz | | 6.68 | 6.30 | 3.90 | 4.65 | 5.14 |
| 8. | Output level at 0.75 μ | dB | −51 | −48 | −41 | −36.5 | −40.5 |
| 9. | Modulation noise | dB | −47 | −52 | −48 | −52 | −54 |

Identification
A - 3M-971 tape, product of Minnesota Mining and Manufacturing Co., St. Paul, Minn.
B - 3M-971 tape, product of Minnesota Mining and Manufacturing Co., St. Paul, Minn.
C - Ampex 787 tape, product of Ampex Corporation, Redwood City, Calif.
D - 3M-888 tape, product of Minnesota Mining and Manufacturing Co., St. Paul, Minn.
E - TDK Avilyn tape, product of TDK Electronics Corp., Long Island City, N. Y.

From the data reported in Table II it can be seen that magnetic recording elements of this invention (Examples 1-8, 14 and 15) clearly exhibit significant improvements in the combinations of output and modulation noise in comparison to elements (Examples 9-13 and 16) that fail to meet our required combination of porosity, support surface roughness, magnetic recording medium thickness, recording medium surface smoothness, and ratio of recording medium thickness to support surface roughness (t/r). The data reported in Table III also illustrates that high quality commercially available magnetic tapes do not have the aforementioned required combination of characteristics and also fail to exhibit the excellent output and modulation noise level of tapes prepared as described herein.

EXAMPLE 17

As previously indicated, the magnetic recording media employed in the practice of this invention can comprise nonmagnetic pigment containing layers in addition to the magnetic recording layers. The following procedure is presented to illustrate this feature of the invention and can be expected to provide the results indicated.

A magnetic dispersion is made as in Examples 1-16 and designated Dispersion A. In addition, a portion of the same acicular gamma ferric oxide doped with 2 percent cobalt is heated in air in the dry state to 300° C. for one hour to complete the transition from the gamma to the nonmagnetic alpha form without any significant change in particle characteristic such as size or shape. This converted alpha ferric oxide is then made into a dispersion with the following composition and ground in a 1 liter ball mill for 168 hours,

| Acicular alpha ferric oxide | 200 parts |
|---|---|
| Vinnol | 30 parts |
| Edenol | 4 parts |
| Methyl isobutyl ketone | 180 parts |

To the above dispersion is added the following: ball milling is continued for 48 hours and the resulting product is designated Dispersion B.

| Vinnol | 10 parts |
|---|---|
| Edenol | 4 parts |
| Methyl isobutyl ketone | 148 parts |

The resulting Dispersion B is coated onto a poly(ethylene terephthalate) support having a peak-to-peak roughness of 0.2 micron and Dispersion A is coated over Dispersion B to form a composite of dry layers of respective thicknesses 6 microns and 3 microns respectively and containing about 18 percent, by volume, of air voids.

The dried composite of layers, while the binder is still in a thermoplastic condition, is calendered between steel and cotton rolls with the magnetic recording layer against the steel roll. The steel roll is maintained at a temperature of about 85° C. and the force exhibited between the rolls is about 240 kg/cm until the thickness of the layer composite is reduced to 6.5 microns and the content of the voids is reduced to 14 percent, by volume. After calendering, the magnetic recording layer can be expected to have a coercivity of 600 Oe, saturation output of $-35$, a surface smoothness, determined as "percent contact area" of 88 percent, a modulation noise of $-58$ and a $\phi_{rx}/\phi_{rz}$ of 4.32.

The invention has been described in detail with particular reference to preferred embodiments thereof, but it will be understood that variations and modifications can be effected within the spirit and scope of the invention.

What is claimed is:

1. A magnetic recording element comprising a support having a surface with a peak-to-peak roughness up to about 0.5 micron which surface is coated with a magnetic recording medium having a thickness in the range of 4 to about 20 microns; said medium comprising (1) about 8 to 30 percent, by volume, of discrete, non-solid, nonmagnetizable voids substantially homogeneously dispersed therein and (2) aligned and oriented acicular magnetizable particles dispersed in a magnetic recording layer which layer forms a surface of said element and has a surface smoothness, determined as percent contact area, of at least 86 percent, the ratio of said thickness to said peak-to-peak roughness (t/r) being at least about 10.

2. A magnetic recording element according to claim 1 in which said volume of voids is about 15 to 30 percent.

3. A magnetic recording element according to claim 1 in which said acicular magnetizable particles are doped iron oxide particles having a coercivity of at least 450 Oe.

4. A magnetic recording element according to claim 3 in which said voids are air voids and the major axes of said acicular particles are up to about 1.5 microns.

5. A magnetic recording element according to claim 3 in which said iron oxide particles are doped with about 1 to 6 percent, by weight, of cobalt, nickel, zinc, manganese, or chromium ions, have an acicularity of at least 15 and a particle size in the range of about 0.3 to 0.9 micron.

6. A magnetic recording element according to claim 1 in which said magnetic recording layer has a surface smoothness, determined as percent contact area, of at least about 88 percent.

7. A magnetic recording element according to claim 6 in which the surface of said support coated with said medium has a peak-to-peak surface roughness up to about 0.3 micron.

8. A magnetic recording element according to claim 7 in which the peak-to-peak surface roughness of said support is 0.1 micron or less.

9. A magnetic recording element according to claim 7 in which said thickness is about 5 to 12 microns.

10. A magnetic recording element according to claim 7 in which said acicular magnetizable particles are gamma ferric oxide particles and the ratio of the remanent flux in the direction of alignment of said particles in the plane of said magnetic layer ($\phi_{rx}$) to remanent flux in the direction perpendicular to said plane ($\phi_{rz}$) is at least equal to the flux ratio determined according to the equation:

$$\log_{10}(\phi_{rx}/\phi_{rz}) = 1.13 - (H_c/1050)$$

where $H_c$ is the coercivity of said magnetic recording layer in Oersteds.

11. A magnetic recording element according to claim 1, in which the ratio (t/r) is in the range of about 20 to 200.

12. A magnetic recording element comprising a support having a surface with a peak-to-peak roughness in the range of about 0.1 to about 0.3 micron which surface is coated with a magnetic recording medium having a thickness in the range of about 5 to 12 microns; said medium comprising (1) about 15 to 30 percent, by volume, of discrete non-solid, nonmagnetizable voids substantially homogeneously dispersed therein and (2) aligned and oriented acicular gamma ferric oxide particles having maximum dimensions that do not exceed 1.5 microns and are dispersed in a magnetic recording layer which layer (a) forms a surface of said element and has a surface smoothness, determined as percent contact area, of at least 88 percent, and (b) has a ratio of the remanent flux in the direction of alignment of said particles in the plane of said layer ($\phi_{rx}$) to remanent flux in the direction perpendicular to said plane ($\phi_{rz}$) which is at least equal to the flux ratio determined according to the equation:

$$\log_{10}(\phi_{rx}/\phi_{rz}) = 1.13 - (H_c/1050)$$

where $H_c$ is the coercivity of said magnetic recording layer in Oersteds, the ratio of said thickness to said peak-to-peak roughness (t/r) being from about 50 to about 150.

13. A magnetic recording element according to claim 7 in which said acicular magnetizable particles are ferrous ferric oxide particles and the ratio of the remanent flux in the direction of alignment of said particles in the plane of said magnetic layer ($\phi_{rx}$) to remanent flux in the direction perpendicular to said plane ($\phi_{rz}$) is at least equal to the flux ratio determined according to the equation:

$$\log_{10}(\phi_{rx}/\phi_{rz}) = 1.20 - (H_c/1360)$$

where $H_c$ is the coercivity of said magnetic recording layer in Oersteds.

14. A process for the manufacture of a magnetic recording element having both low modulation noise and high magnetic particle alignment and orientation which process comprises the steps of:
  (a) forming a dispersion of acicular magnetizable particles in a solution of binder in solvent,
  (b) coating a support having a peak-to-peak roughness up to about 0.5 micron with a magnetic medium comprising a layer of said dispersion as the outermost layer with respect to said support,
  (c) applying a magnetic field to said medium while it still contains solvent to align said magnetic particles, in the plane of said layer,
  (d) removing substantially all solvent within said medium while forming at least 10 percent, by volume, of substantially homogeneously dispersed, discrete, gaseous non-magnetizable voids, and
  (e) compacting said medium to reduce the volume of said voids by at least 15 percent to a final volume of about 8 to 30 percent and to obtain a ratio of said thickness to said peak-to-peak roughness of at least about 10 while imparting a surface smoothness, determined as percent contact area, of at least 86 percent to said layer.

15. A process according to claim 14 in which said medium is compacted to reduce the volume of said voids by at least 20 percent.

16. A process according to claim 14 in which said voids are air voids.

17. A process according to claim 14 in which the major axes of said acicular particles is up to about 1.5 microns.

18. A process according to claim 14 in which the major axes of said acicular particles is about 0.3 to 0.9 micron and said layer is compacted to a thickness in the range of about 5 to 12 microns.

19. A process according to claim 18 in which said support has a peak-to-peak surface roughness up to about 0.3 micron.

20. A process according to claim 19 in which said layer of dispersion is coated by extrusion coating.

21. A process according to claim 20 in which said dispersion is formed by initially dispersing said acicular magnetizable particles in about 65 to 90 percent, by weight, of the total polymer binder in solvent required for coating said dispersion and subsequently adding to said dispersion the remaining required polymer binder in solvent to obtain a viscosity up to about 100 cps.

22. A process according to claim 17 in which said magnetizable particles are doped iron oxide particles having a coercivity of at least 450 Oe.

23. A process according to claim 22 in which said iron oxide particles are doped with about 1 to 6 percent, by weight, of cobalt ions.

* * * * *

UNITED STATES PATENT AND TRADEMARK OFFICE
CERTIFICATE OF CORRECTION

PATENT NO. : 4,163,823
DATED : August 7, 1979
INVENTOR(S) : Jean-Pierre Legras, Claude M. Marechal It is certified that error appears in the above-identified patent and that said Letters Patent are hereby corrected as shown below:

Columns 13 and 14, in TABLE I:

Line 5, shift each value reported for Coercivity one column to the right in TABLE I.

Line 21, shift each value reported for thickness one column to the right in TABLE I.

Line 31, insert --2-- under Example No. 16

Line 38, "Duration of Hours" should be --Duration of milling--.

Line 38, "HOurs" should be --Hours--.

Line 41, replace "1 only" with --4-- under Example No. 15.

Line 41, insert --4-- under Example No. 16.

In blank space between lines 41 and 42, delete "4" under Example No. 15.

UNITED STATES PATENT AND TRADEMARK OFFICE
CERTIFICATE OF CORRECTION

PATENT NO. : 4,163,823

DATED : August 7, 1979

INVENTOR(S) : Jean-Pierre Legras, Claude M. Marechal

Page 2 of 2

It is certified that error appears in the above-identified patent and that said Letters Patent are hereby corrected as shown below:

Line 45, shift each value reported for Thickness one column to the right in TABLE I.

Line 46, shift each value reported for Roughness one column to the right in TABLE I.

Columns 15 and 16, in TABLE II:

Line 25, delete "83" under Example No. 14.

Signed and Sealed this

Fifth Day of February 1980

[SEAL]

Attest:

Attesting Officer

SIDNEY A. DIAMOND

Commissioner of Patents and Trademarks